US009182143B2

(12) United States Patent
Fujimura et al.

(10) Patent No.: US 9,182,143 B2
(45) Date of Patent: Nov. 10, 2015

(54) ROOM PRESSURE CONTROLLING SYSTEM

(75) Inventors: Takashi Fujimura, Tokyo (JP); Yasuhito Oomagari, Tokyo (JP); Rintaro Oomura, Tokyo (JP)

(73) Assignee: Azbil Corporation, Tokyo (JP)

( * ) Notice: Subject to any disclaimer, the term of this patent is extended or adjusted under 35 U.S.C. 154(b) by 665 days.

(21) Appl. No.: 13/468,410

(22) Filed: May 10, 2012

(65) Prior Publication Data

US 2012/0289139 A1 Nov. 15, 2012

(30) Foreign Application Priority Data

May 13, 2011 (JP) ................................ 2011-107961

(51) Int. Cl.

| | |
|---|---|
| ***F24F 11/00*** | (2006.01) |
| ***F24F 7/00*** | (2006.01) |
| ***G05D 16/00*** | (2006.01) |
| ***F24F 11/04*** | (2006.01) |
| *B08B 15/02* | (2006.01) |

(52) U.S. Cl.

CPC ............... *F24F 11/04* (2013.01); *B08B 15/023* (2013.01); *F24F 2011/0042* (2013.01)

(58) Field of Classification Search

CPC . F24F 11/04; F24F 2011/0042; B08B 15/023
USPC .................................................... 454/61, 238
See application file for complete search history.

(56) References Cited

U.S. PATENT DOCUMENTS

| | | | | |
|---|---|---|---|---|
| 4,257,318 A * | 3/1981 | Johannsen | .................... | 454/229 |
| 4,706,553 A * | 11/1987 | Sharp et al. | ..................... | 454/61 |
| 5,115,728 A * | 5/1992 | Ahmed et al. | .................. | 454/61 |
| 5,170,673 A * | 12/1992 | Ahmed et al. | .................. | 454/56 |
| 5,304,093 A * | 4/1994 | Sharp et al. | ...................... | 454/61 |
| 5,312,297 A * | 5/1994 | Dieckert et al. | .............. | 454/238 |
| 5,385,505 A * | 1/1995 | Sharp et al. | ................... | 454/238 |
| 5,435,779 A * | 7/1995 | Sharp et al. | ..................... | 454/61 |

(Continued)

FOREIGN PATENT DOCUMENTS

| | | |
|---|---|---|
| JP | 9-201540 A | 8/1997 |
| JP | 2006-078010 | 3/2006 |
| JP | 2008-224178 | 9/2008 |

OTHER PUBLICATIONS

Japanese Office Action dated Dec. 25, 2014, which issued during prosecution of Japanese Application No. 2011-107961, which corresponds to the present application.

*Primary Examiner* — Alissa Tompkins
*Assistant Examiner* — Phillip E Decker
(74) *Attorney, Agent, or Firm* — Troutman Sanders LLP

(57) ABSTRACT

A room pressure controlling system having a local exhaust valve, a supply air valve, a common exhaust air valve, controllers and a differential pressure sensor. The controller calculates a correction control output value for the valve operated as the room pressure controlling valve, which is either the supply air valve or the common exhaust air valve, based on a setting value and a room pressure measured by the differential pressure sensor. The controller evaluates whether or not the supply airflow rate and/or the exhaust airflow rate is changing, and if an airflow rate is changing, emphasizes rapid responsiveness of the room pressure control than a reduction in the frequency of actuation of the room pressure controlling valve, if the airflow rate is stable, the controller emphasizes the reduction in the frequency of actuation of the room pressure controlling valve than the rapid responsiveness of the room pressure control.

4 Claims, 5 Drawing Sheets

(56) References Cited

U.S. PATENT DOCUMENTS

| | | | | | |
|---|---|---|---|---|---|
| 5,720,658 | A * | 2/1998 | Belusa | | 454/238 |
| 5,951,394 | A * | 9/1999 | Pariseau | | 454/61 |
| 6,033,302 | A * | 3/2000 | Ahmed et al. | | 454/238 |
| 6,272,399 | B1 * | 8/2001 | Fish et al. | | 454/61 |
| 2004/0121716 | A1 * | 6/2004 | Kreuzer et al. | | 454/61 |
| 2005/0194455 | A1 * | 9/2005 | Alles | | 236/1 B |

* cited by examiner

| Valve | Daytime Design Flow Rate ($m^3$ per Hour) | Nighttime Design Flow Rate ($m^3$ per Hour) |
|---|---|---|
| MAV | 2400 | 400 |
| EXV | 1800 | 100 |
| GEX | 1120 | 100 |
| Offset Airflow α | 200 | 200 |

FIG. 7

| PID Parameter | When Airflow Rate Is Changing | When Airflow Rate Is Stable |
|---|---|---|
| P (Proportional Band) | 200 Pa | 200 Pa |
| I (Integration Time) | 0.1 min. | 0.2 min. |
| D (Differentiation Time) | 0.0 min. | 0.0 min. |

ROOM PRESSURE CONTROLLING SYSTEM

CROSS REFERENCE TO RELATED APPLICATIONS

The present application claims priority under 35 U.S.C. §119 to Japanese Patent Application No. 2011-107961, filed May 13, 2011, which is incorporated herein by reference.

FIELD OF TECHNOLOGY

The present invention relates to a room pressure controlling system for maintaining a constant room pressure through controlling the supply airflow and exhaust airflow of a room.

BACKGROUND

In chemical experiments, during the process of the external operations, often biochemical substances that are harmful to humans are produced. Fume hoods are used as one type of equipment to prevent these biochemical substances from being diffused into a room and to prevent them from coming into contact with the human body. Typically, fume hoods are provided with an enclosure with a sash that can be opened either vertically or horizontally, where an operator in the laboratory can access the inside of the enclosure through the sash. So that the operator will not be exposed to harmful biochemical substances during the operations using the fume hood, the enclosure is connected to a local exhaust duct that removes the biochemical substances.

The room pressure controlling system is a system for maintaining a constant pressure within a room so that when biochemical substances are handled within a fume hood, the airflow rate of the local exhaust duct will be adjusted so as to maintain a specific speed for the planar airflow rate within the sash plane so that there will be no backflow of biochemicals into the room, so that biochemical substances will not leak out of the room and that contamination, and like, will not leak into the room (See, for example, Japanese Unexamined Patent Application Publication H9-201540). FIG. 8 is a diagram illustrating the structure of a conventional room pressure controlling system. The room pressure controlling system comprises: a fume hood 101 that is disposed within the room 100; a local exhaust duct 102 that is connected to the fume hood 101; a supply air duct 103 for supplying supply air to the room 100; a common exhaust duct 104 for the air of the room 100; a local exhaust air valve EXV for regulating the airflow rate of the local exhaust duct 102; a supply air valve MAV for regulating the airflow rate of the supply air duct 103; a common exhaust air valve GEX for regulating the airflow rate of the common exhaust duct 105; a controller 105 for controlling the local exhaust air valve EXV; a controller 106 for controlling the supply air valve MAV; a controller 107 for controlling the common exhaust air valve GEX; and communication lines 108 for connecting together the various controllers 105-1, 106, and 107. The fume hood 101 is provided with a sash 111 that can be opened and closed, and a sash sensor 112 for detecting the degree of opening of the sash 111.

In this type of room pressure controlling system, in order to maintain the pressure of the room 100 at the setting value, the degrees of opening of the supply air valve MAV and the common exhaust air valve GEX, and of the local exhaust air valve EXV, are controlled so that the supply airflow rate of the supply air duct 103, the exhaust airflow rate of the common exhaust duct 104, and the local exhaust airflow rate of the local exhaust duct 102 will satisfy the relationship of "Supply airflow rate=common exhaust airflow rate+local exhaust airflow rate+offset airflow rate." Moreover, in recent years a PCV (pressure control valve) function, for performing stabilized pressure control by adjusting the degree of opening of the PCV valve based on a pressure differential by measuring the pressure differential between the inside and the outside of the room has been added as well. This PCV function is achieved through causing the room pressure controlling operations to be performed as well in addition to the actual functions of either the supply air valve MAV or the common exhaust air valve GEX.

Conventionally, the valve that has handled the PCV function has been established unchangingly at the time of system configuration, causing it to be operated more frequently then the other valves in order to perform the fine adjustment operations for the room pressure, which is problematic in that the frequency of actuation is higher, reducing the service life. When a valve that handles a PCV function fails, it tends to cause large failures in the room pressure control.

The present invention was created in order to solve the problems set forth above, and the object thereof is to provide a room pressure controlling system able to extend the service life of a valve that is provided with a PCV function and to be able to extend the up-time, and the time between maintenance.

SUMMARY

The room pressure controlling system according to examples of the present invention include a supply air valve for regulating an airflow rate for supply air that is blown into an applicable room; a common exhaust air valve for regulating an airflow rate of exhaust air that is drawn from the applicable room; airflow rate controlling means for outputting a control output value for a supply air valve and a control output value for a common exhaust air valve, so as to cause the difference between the supply airflow rate that is regulated by the supply air valve and the exhaust airflow rate that is regulated by the common exhaust valve to match a specific setting value; differential pressure measuring means for measuring a room pressure that is a pressure difference between an applicable room and a specific reference room; correction output calculating means for calculating a correction control output value for a valve that is operated as a room pressure controlling valve, which is either the supply air valve or the common exhaust air valve, based on a deviation between a room pressure measured by the differential pressure measuring means and a specific setting value; summing means for summing the control output value corresponding to the valve that is used as the room pressure controlling valve and the correction control output value, and outputting the result to the room pressure controlling valve; and flow rate stability evaluating means for evaluating whether or not the supply airflow rate and/or the exhaust airflow rate is changing; wherein when it has been evaluated by the airflow rate stability evaluating means that the airflow rate is changing, the correction output calculating means perform a control calculation emphasizing rapid responsiveness of the air pressure control over the reduction of the frequency of actuation of the room pressure controlling valve, and if the evaluation is that the airflow rate is stable, the correction output calculating means perform a control calculation emphasizing the reduction in the frequency of actuation of the room pressure controlling valve over the instant responsiveness of the room pressure control.

Moreover, an example of a room pressure controlling system according to the present invention further have room pressure stability evaluating means for evaluating whether or not the room pressure measured by the differential pressure measuring means is stable; where when it has been evaluated by the airflow rate stability evaluating means that the airflow rate is stable and it has been evaluated by the room pressure stability evaluating means that the room pressure is stable, the correction output calculating means continue to output the correction control output value that was outputted in the immediately previous calculating period until a time of outputting a correction control output value in a calculating period that is after the current calculating period. Moreover, this example of a room pressure controlling system according to the present invention further has control parameter storing means for storing a plurality of control parameters for use in calculation processes by the correction output calculating means, where when it has been evaluated by the airflow rate stability evaluating means that the airflow rate is changing, the correction output calculating means read out and use, from the control parameter storing means, a control parameter that emphasizes rapid responsiveness of room pressure control more greatly than a reduction in the frequency of actuation of the room pressure controlling, valve, and if it has been evaluated that the airflow rate is stable, then the correction output calculating means read out and use, from the control parameter storing means, a control parameter that emphasizes a reduction in the frequency of actuation of the room pressure controlling valve more greatly than the rapid responsiveness of the room pressure control.

Moreover, the example of a room pressure controlling system further includes calculating period storing means for storing a plurality of calculating periods used in the calculating processes of the correction output calculating means, where when it has been evaluated by the airflow rate stability evaluating means that the airflow rate is changing, the correction output calculating means read out and use, from the calculating period storing means, a value for the calculating period that emphasizes rapid responsiveness of room pressure control more greatly than a reduction in the frequency of actuation of the room pressure controlling valve, and if it has been evaluated that the airflow rate is stable, then the correction output calculating means read out and use, from the calculating period storing means, a value for the calculating period that emphasizes a reduction in the frequency of actuation of the room pressure controlling valve more greatly than the rapid responsiveness of the room pressure control.

Moreover, this example of a room pressure controlling system also has a fume hood that is equipped within the applicable room; and a local exhaust valve for regulating the exhaust airflow rate of the fume hood; and local exhaust airflow rate regulating means for controlling the local exhaust air valve so that the planar air speed of a sash plane of the fume hood is a specified value; where the airflow rate controlling means output a control output value for the supply air valve and a control output value for the common exhaust air valve so that the difference between the supply airflow rate that is regulated by the supply air valve and the exhaust airflow rate that is regulated by the local exhaust air valve and the common exhaust air valve matchs a specific setting value.

The examples of the present invention make it possible to reduce the frequency of actuation of the room pressure controlling valve while maintaining a constant room pressure, through changing the calculations for the control of the room pressure for when the airflow rate is changing and for when the airflow rate is stable. It is possible to extend the service life of the valve, while using an inexpensive valve, thereby enabling a decrease in the system cost.

Moreover, it is possible to stop the operation of the room pressure controlling valve by suspending the output of the correction controlling output value and suspending the room pressure control when the airflow rate is stable and the room pressure is stable, making it possible to further reduce the frequency of actuation of the room pressure controlling valve.

BRIEF DESCRIPTION OF THE DRAWINGS

FIG. 7 is a diagram illustrating one example of PID parameters when the airflow rate is changing and PID parameters when the airflow rate is stable.

DETAILED DESCRIPTION

Figure 1:
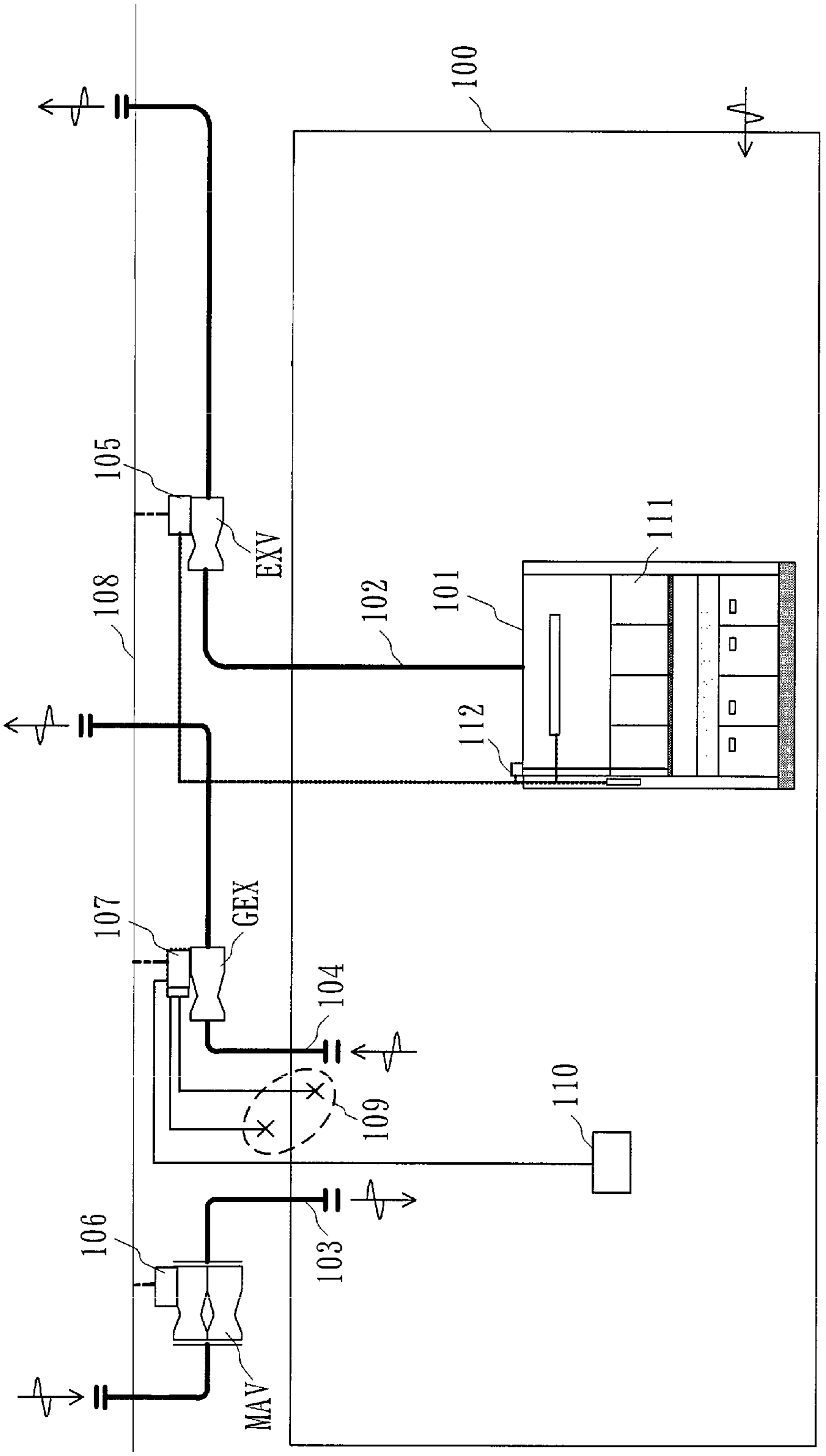
FIG. 1 is a diagram illustrating a structure of a room pressure controlling system according to an example according to the present invention.
Figure 8:
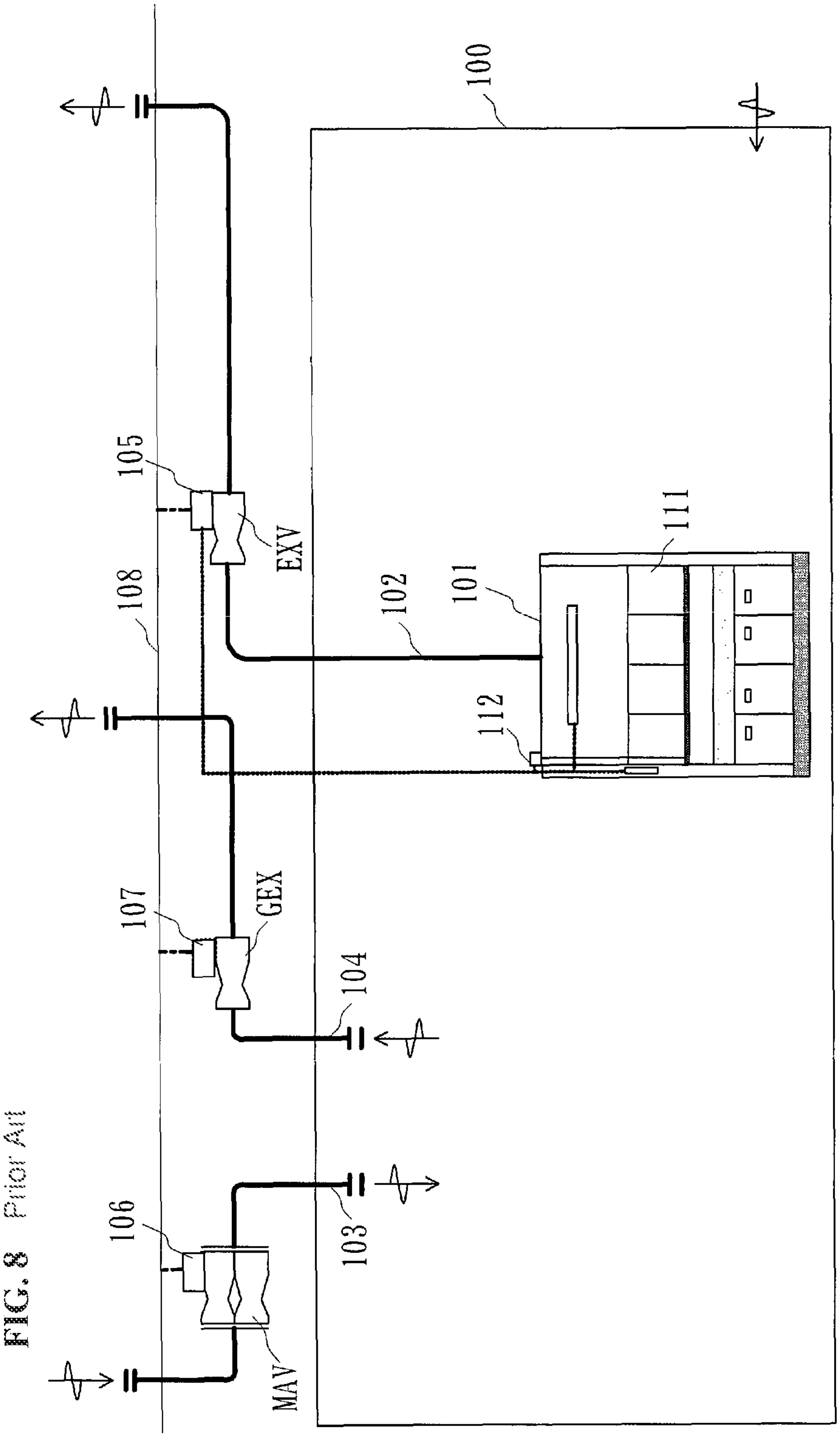
FIG. 8 Prior Art
FIG. 8 is a diagram illustrating a conventional structure for a room pressure controlling system.

Forms for carrying out the present invention are explained below in reference to the figures. FIG. 1 is a diagram illustrating a structure for a room pressure controlling system according to an example, where structures that are identical to those of FIG. 8 are assigned identical codes. The room pressure controlling system according to the present example is structured from a fume hood 101 that is disposed within the room 100; a local exhaust ducts 102; a supply air duct 103; a common exhaust duct 105; a local exhaust air valve EXV; a supply air valve MAV; a common exhaust air valve GEX; controllers 105, 106, and 107; a communication line 108; a differential pressure sensor 109 for measuring the pressure difference between the room 100 and a specific reference chamber (a space outside of the room 100 in the present example); and a room pressure monitor 110 for checking the pressure difference.

Figure 2:
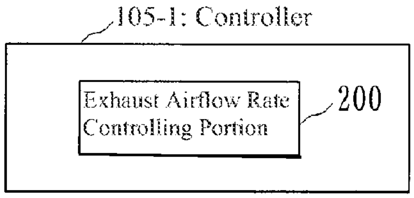
FIG. 2 is a block diagram illustrating an example of a structure for a controller for a local exhaust according to another example.
Figure 3:
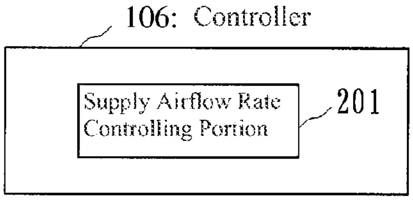
FIG. 3 is a block diagram illustrating an example of a structure for a controller for supply air according to a further example.
Figure 4:
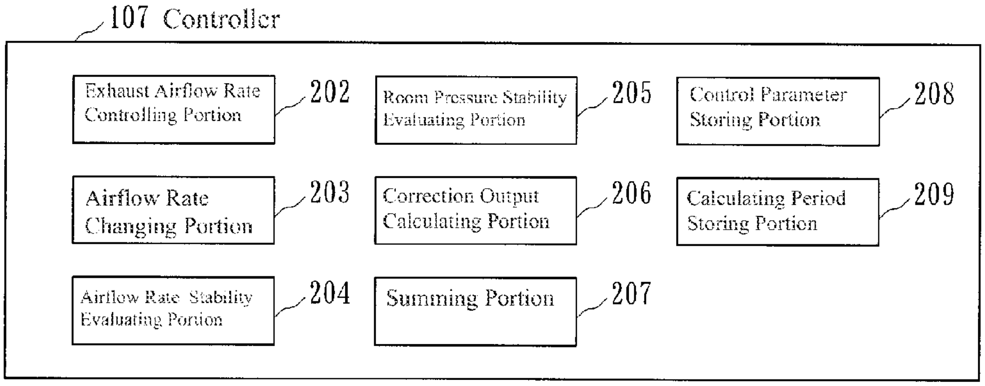
FIG. 4 is a block diagram illustrating an example of a structure for a controller for a common exhaust according to yet another example.

FIG. 2 is a block diagram illustrating a structural example of a controller 105; FIG. 3 is a block diagram illustrating a structural example of a controller 106; and FIG. 4 is a block diagram illustrating a structural example of a controller 107.

The controller 105 has an exhaust airflow rate controlling portion 200 for controlling the local exhaust air valve EXV.

The controller 106 has a supply airflow rate controlling portion 201 for controlling the supply air valve MAV.

The controller 107 has an exhaust airflow rate controlling portion 202 for controlling a common exhaust valve GEX; an air flow rate changing portion 203 for changing gradually a supply airflow rate and an exhaust airflow rate at the time of a specific airflow rate switching controlling operation; an airflow rate stability evaluating portion 204 for evaluating whether or not the supply airflow rate and/or the exhaust airflow rate is changing; a room pressure stability evaluating portion 205 for evaluating whether or not the room pressure measured by the differential pressure sensor 109 is stable; a correction output calculating portion 206 for calculating, based on a room pressure measured by the differential pressure sensor 109 and on a specific setting value, a correction control output value for a valve that is operated as a room pressure controlling valve, which is either the supply air valve MAV or the common exhaust air valve GEX; a summing portion 207 for summing the control output value corresponding to the valve that is operated as the room pressure controlling valve with the correction control output value, and for outputting the sum value to the room pressure controlling valve; a control parameter storing portion 208 for storing a plurality of control parameters used in the calculation processes of the correction output calculating portion 206; and a calculating period storing portion 209 for storing a plurality of calculating periods that are used in the calculation processes in the correction output calculating portion 206.

The exhaust airflow rate controlling portion 200 of the controller 105 structures local exhaust airflow rate regulating means. The supply airflow rate controlling portion 201 of the controller 160, and the exhaust airflow rate controlling portion 202 and airflow rate changing portion 203 of the controller 107 structure the airflow rate controlling means.

Note that while in the present example, an airflow rate changing portion 203, an airflow rate stability evaluating portion 204, a room pressure stability evaluating portion 205, a correction output calculating portion 206, a summing portion 207, and a control parameter storing portion 208 are provided in the controller 107, there is no limitation thereto, but rather the airflow rate changing portion 203, the airflow rate stability evaluating portion 204, the room pressure stability evaluating portion 205, the correction output calculating portion 206, the summing portion 207, and the control parameter storing portion 208 may be provided in another controller, or may be provided in a central monitoring device, not shown.

The airflow rate balance controlling operation during normal operation of the room pressure controlling system is explained next. Here the supply airflow rate that is blown out from the supply air duct 103 is defined as Vmav, the airflow rate of the exhaust that is drawn out by the common exhaust duct 104 is defined as Vgex, and the airflow rate of the exhaust that is drawn out by the local exhaust duct 102 is defined as Vexv.

The exhaust airflow rate controlling portion 200 of the controller 105 establishes the airflow rate Vexv based on the sash opening area of the fume hood 102 so that the planar airflow rate in the plane of the sash is a specified value (normally 0.5 m/s), and controls the degree of opening of the local exhaust air valve EXV so that the exhaust airflow rate of the local exhaust duct 101 is Vexv. Note that the sash opening area of the fume hood 101 can be established by multiplying together the known sash width by the height of the opening portion of the sash 112, which can be calculated from the degree of sash opening detected by the sash sensor 112.

The exhaust airflow rate controlling portion 202 of the controller 107 controls the degree of opening of the common exhaust air valve GEX to reduce the airflow rate Vgex by the amount of change in the exhaust airflow rate Yexv depending on the degree of opening of the sashes, so that the total exhaust airflow rate (Vgex+Vexv) is constant, to produce a control output value so that the exhaust airflow rate of the common exhaust duct 104 will go to Vgex.

The supply airflow rate controlling portion 201 of the controller 106 controls the degree of opening of the supply air valve MAV by determining an airflow rate Vmav such that at least a minimum airflow rate is always be blown out so as to satisfy a minimum exchange airflow rate for the room 100, and producing a control output value so that the supply airflow rate of the supply air duct 103 goes to Vmav. Vmav is set so as to be no less than the minimum exchange airflow rate, in order to maintain the minimum exchange airflow rate of the room 100.

Through the method of setting the airflow rates as set forth above, Equation (1) is satisfied when the fume hood 101 not is used (that is, when the sash 111 is completely closed):

$$Vmav=Vgex+\alpha \tag{1}$$

The constant α is an offset airflow rate for not only determining the rate with which air leaks from the room 100, but also for determining whether the room 100 is to be caused to be at positive pressure or negative pressure.

In addition, when the fume hood 101 is used, then Equation (2) is satisfied:

$$Vmav+Vgex+Vexv+\alpha \tag{2}$$

Note that if for example, the exhaust airflow rate Vexv were to go to the maximum airflow rate (Vexv)max then the exhaust airflow rate controlling portion 202 of the controller 107 would attempt to balance the airflow rates by reducing the airflow rate Vgex; however, even if an attempt were made to balance the airflow rate by an operation to reduce the airflow rate Vgex alone, if the degree of opening of the common exhaust air valve GEX has reached 0%, then the airflow rate Vgex cannot be reduced any further. In such a case, the supply airflow rate controlling portion 201 of the controller 106 would regulate the airflow rate Vmav so as to satisfy Equation (3):

$$Vmav=Vgex+(Vexv)\mathrm{max}+\alpha \tag{3}$$

The airflow rate balance controlling operations described above vary the supply airflow rate Vmav and the exhaust airflow rate Vgex in accordance with the variation when there is variation in the local exhaust airflow rate Vexv accompanying opening or closing of the sash 111 of the fume hood 101.

The airflow rate balance controlling operations described above vary the supply airflow rate Vmav and the exhaust airflow rate Vgex in accordance with the variation when there is variation in the local exhaust airflow rate Vexv accompanying opening or closing of the sash 111 of the fume hood 101. This change in the airflow rate, on weekdays, is performed every day. In the example of switching the time band from daytime to nighttime, both the supply airflow rate Vmav and the exhaust airflow rate Vgex are gradually decreased, and in the example of switching the time band from nighttime to daytime, both the supply airflow rate Vmav and the exhaust airflow rate Vgex are gradually increased.

Explaining the airflow rate switch controlling operation more specifically, when switching the time band from daytime to nighttime, the airflow rate changing portion 203 of the controller 107 sends instructions to the controller 106 to gradually decrease the supply airflow rate Vmav from the daytime airflow rate value that has been set in advance for the daytime time band. The supply airflow rate controlling portion 201 of the controller 106 controls the degree of opening of the supply air valve MAV by outputting a control output value to produce the supply airflow rate Vmav that has been directed by the airflow rate changing portion 203. Moreover, the airflow rate changing portion 203 sends a control output value for the exhaust so as to decrease the exhaust airflow rate Vgex in accordance with the decrease in the supply airflow rate Vmav. At this time, the exhaust airflow rate Vgex is determined so as to satisfy Equation (1) or Equation (2). The airflow rate changing portion 203 performs the changing of the airflow rate until the supply airflow rate Vmav reaches the nighttime design airflow rate value that has been set in advance for the nighttime time band.

On the other hand, when switching the time band from nighttime to daytime, the airflow rate changing portion 203 sends instructions to the controller 106 to gradually increase the supply airflow rate Vmav from the nighttime airflow rate value. The supply airflow rate controlling portion 201 of the controller 106 controls the degree of opening of the supply air valve MAV by outputting a control output value to produce the supply airflow rate Vmav that has been directed by the airflow rate changing portion 203. Moreover, the airflow rate changing portion 203 sends a control output value for the exhaust so as to increase the exhaust airflow rate Vgex in accordance with the increase in the supply airflow rate Vmav. At this time, the exhaust airflow rate Vgex is determined so as to satisfy Equation (1) or Equation (2). The airflow rate changing portion 203 performs the changing of the airflow rate until the supply airflow rate Vmav reaches the daytime design airflow rate value.

Figures 5, 6:
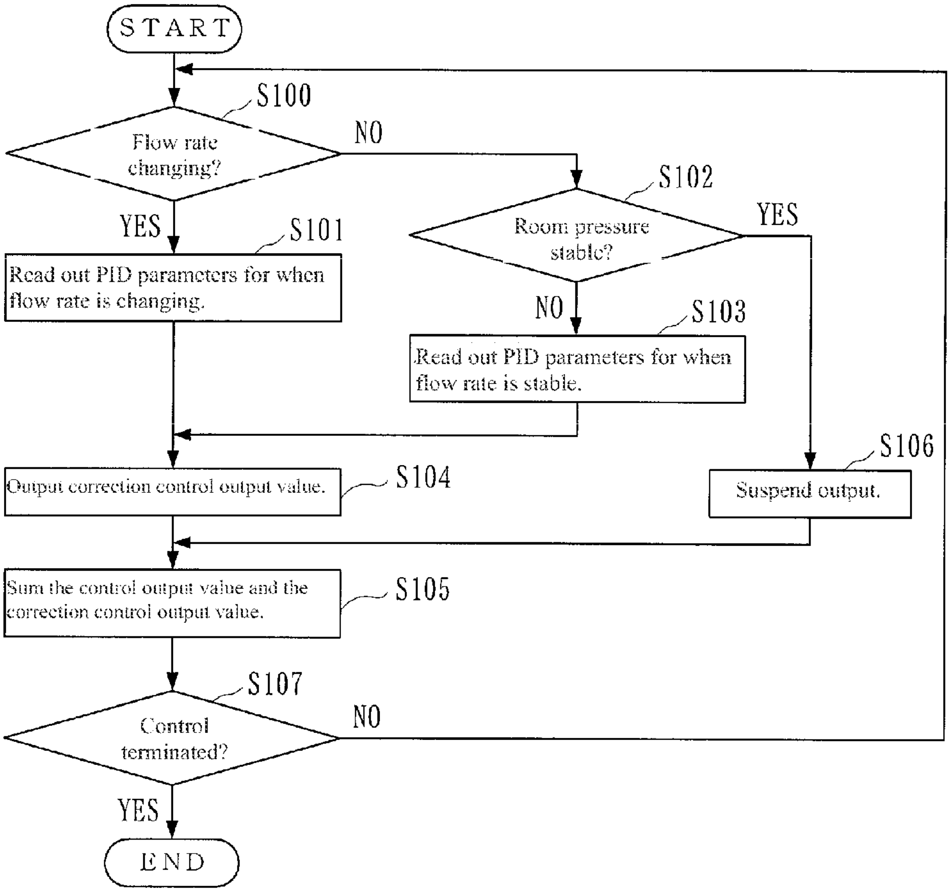
FIG. 5 is a diagram illustrating one example of a daytime design airflow rate value and a nighttime design airflow rate value.
FIG. 6 is a flowchart for explaining the PCV controlling operation in a room pressure controlling system according to a form of embodiment according to the present invention.

FIG. 5 shows one example of a daytime design airflow rate value and a nighttime design airflow rate value. In the example in FIG. 5, during the daytime, the supply airflow rate Vmav is set to 2400 $m^3$ per hour, the local exhaust airflow rate Vexv is set to 1080 $m^3$ per hour, the exhaust airflow rate Vgex is set to 1120 $m^3$ per hour, and the offset airflow rate $\alpha$ is set to 200 $m^3$ per hour. Moreover, during the nighttime, the supply airflow rate Vmav is set to 400 $m^3$ per hour, the local exhaust airflow rate Vexv is set to 100 $m^3$ per hour, the exhaust airflow rate Vgex is set to 100 $m^3$ per hour, and the offset airflow rate $\alpha$ is set to 200 $m^3$ per hour.

As an example of changing the supply airflow rate Vmav and the exhaust airflow rate Vgex, there is the case of stopping the supply and exhaust air fans when fumigating another room 100 or when not in use, or the case of switching from a state wherein the supply and exhaust fans are stopped to a normal operating state, and, initially, a case wherein the supply airflow rate Vmav is changed due to temperature control.

The room pressure controlling valve (PCV) controlling operations that are performed in parallel with the operations described above are explained next. FIG. 6 is a flowchart for explaining the PCV controlling operation. In the present example, the common exhaust air valve GEX functions as a PCV.

The airflow rate stability evaluating portion 204 of the controller 107 evaluates whether or not the supply airflow rate Vmav and/or the exhaust airflow rate Vgex is changing (Step S100).

The correction output calculating portion 206 of the controller 107, when there is an evaluation by the airflow rate stability evaluating portion 204 that the airflow rate is changing (Step S100: YES), reads out, from the control parameter storing portion 208, the PID parameters corresponding to the airflow rate changing, and sets the PID parameters internally (Step S101).

On the other hand, the room pressure stability evaluating portion 205 of the controller 107, when the evaluation is that there is no change in the supply airflow rate Vmav nor in the exhaust airflow rate Vgex, and thus that the airflow rate is stable (Step S100: NO), evaluates whether or not the room pressure (the inside/outside pressure difference) is stable (Step S102). If the absolute value |SP−dPE| of the deviation between the setting value SP for the room pressure and the room pressure dPE measured by the differential pressure sensor 109 is within a room pressure stability threshold value (for example, 3 Pa) continuously over at least a room pressure stability evaluating interval (for example, 3 seconds), then the room pressure stability evaluating portion 205 evaluates that the room pressure is stable, but if the absolute value |SP−dPE| of the deviation exceeds a room pressure variation threshold value (for example, 4.5 Pa) continuously for at least a room pressure change evaluating period (for example, 30 seconds), then the room pressure stability evaluating portion 205 evaluates that the room pressure is changing.

When there is an evaluation by the airflow rate stability evaluating portion 204 that the airflow rate is stable and there is an evaluation by the room pressure stability evaluating portion 205 that the room pressure is changing (Step S102: NO), then the correction output calculating portion 206 of the controller 107 reads out, from the control parameter storing portion 208, the ND parameters corresponding to the airflow rate being stable, and sets the PID parameters internally (Step S103).

One example of a PID parameter when the airflow rate is changing and a PID parameter when the airflow rate is stable is illustrated in FIG. 7. As is well-known, as PID parameters there are the proportional band P, the integrating time I, and the differentiating time D. When the airflow rate is changing, the proportional band P is 200 Pa, the integrating time I is 0.1 min., and the differentiating time D is 0 min. On the other hand, when the airflow rate is stable, the proportional band P is 200 Pa, the integrating time I is 0.2 min., and the differentiating time D is 0 min. In the example in FIG. 7, the integrating time I changes to I=0.2 min. when the airflow rate is stable, as opposed to I=0.1 min. when the airflow rate is changing. In this way, the optimal PID parameters to be applied various control situations are recorded in advance in the control parameter storing portion 208.

After the PID parameters are set in Step S101 or S103, the correction output calculating portion 206 calculates, through a known PID control algorithm, the amount of increase or decrease in the airflow rate Vgex so as to eliminate the deviation between the setting value SP and the room pressure dPE, to produce a correction control output value so as to change the exhaust airflow rate Vgex of the common exhaust duct 104 by the amount of increase or decrease calculated (Step S104).

The summing portion 207 of the controller 107 sums the control output value for the exhaust air, outputted by the exhaust airflow rate controlling portion 202, or the control output value for the exhaust air outputted by the airflow rate changing portion 203, together with the correction control output value outputted by the correction output calculating portion 206, and outputs the result to the common exhaust air valve GEX (Step S105). If during an airflow balance controlling operation, then the control output value for the exhaust air, outputted from the exhaust airflow rate controlling portion 202, and the correction control output value are summed together, but if during an airflow rate switch controlling operation, the control output value for the exhaust air, outputted from the airflow rate changing portion 203, and the correction control output value are summed together. In this way, at the same time as the adjustment to the degree of opening of the common exhaust air valve GEX by the airflow rate balance controlling operation or the airflow switching controlling operation, fine adjustments to the degree of opening of the common exhaust air valve GEX are performed by the PCV controlling operation, to thereby control the room pressure.

On the other hand, if there has been an evaluation by the airflow rate stability evaluating portion 204 that the airflow rate is stable and an evaluation by the room pressure stability evaluating portion 205 that the room pressure is stable (Step S102: YES), then the correction output calculating portion 206 suspends the outputting of the correction control output value calculated by the aforementioned PID control algorithm, and continuously outputs the correction control output value calculated during the immediately previous calculating period, until a correction control output value is outputted during a calculating period that is after the present calculating period (Step S106).

The correction control output value is summed, as described above, with the control output value for the exhaust air, and outputted to the common exhaust air valve GEX (Step S105), but because here the airflow rate is stable, the correction control output value is also maintained as-is at its immediately previous value, without the control output value changing from the immediately previous value. Consequently, the common exhaust valve GEX is not actuated, and the degree of opening at that time is maintained.

The processes in Step S100 through S106 are performed repetitively with each calculating period until the room pressure control is terminated (Step S107: YES).

As described above, in the present example it is possible to reduce the frequency of actuation of the common exhaust valve GEX while maintaining a constant room pressure, doing so through changing the PID parameters for the room pressure control when the airflow rate is changing versus when the airflow rate is stable, thus making it possible to extend the service life of the common exhaust air valve GEX. When the airflow rate is changing, then strict control of the airflow rate is necessary in relation to the changes in the room pressure. Consequently, PID parameters are used that emphasize rapid responsiveness of the room pressure control, rather than emphasizing the reduction in the frequency of actuation of the common exhaust air valve GEX. On the other hand, when the airflow rate is stable, then it is possible to maintain a constant room pressure even without frequent fine adjustments of the degree of opening of the common exhaust air valve GEX. Given this, PID parameters that emphasize more greatly a reduction in the frequency of actuation of the common exhaust air valve GEX, rather than the rapid responsiveness of the room pressure control, are used when the airflow rate is stable.

Moreover, in the present example it is possible to stop the operation of the common exhaust air valve GEX, to further reduce the frequency of actuation of the common exhaust air valve GEX, by suspending the output of the correction control output value, to suspend the room pressure control, if the airflow rate is stable and the room pressure is stable.

For safety, in a room pressure controlling system it is important to maintain a specific room pressure so to avoid an inversion of the inside/outside pressure difference. The system must fulfill this requirement, and must be a low-cost, long-life, high-reliability system. In order to reduce the cost of the system it is necessary to use inexpensive valves, requiring service-life countermeasures. In the present example, it is possible to reduce the cost of the system through the ability to extend the service life of the valve while using inexpensive valves.

Note that although in the present example the PID parameters for the room pressure control were changed between when the airflow rate is changing and when the airflow rate is stable, there is no limitation thereto, but rather the calculating period for the room pressure control may be changed between when the airflow rate is changing and when the airflow rate is stable. Specifically, if the airflow rate is changing, then the correction output calculating portion 206 may use, from the calculating period storing portion 209, a value for the calculating period that more greatly emphasizes rapid responsiveness in the room pressure control than it does the reduction in the frequency of actuation of the common exhaust air valve GEX, and when the airflow rate is stable, it may read in and use, from the calculating period storing portion 209, a calculating period that more greatly emphasizes a reduction in the frequency of actuation of the common exhaust air valve GEX then it does rapid responsiveness of the room pressure control. The PID calculating period when the airflow rate is stable is longer than the calculating period when the airflow rate is changing.

Moreover, in the present example, the common exhaust air valve GEX functioned as a PCV; however, the supply air valve MAV may be caused to function as the PCV instead. However, when the supply air valve MAV is caused to function as the PCV, the summing portion 207 during the airflow rate balance controlling operation would sum the control output value outputted by the supply airflow rate controlling portion 201 of the controller 106 and the correction control output value outputted by the correction output calculating portion 206, and output the result to the supply air valve MAV. Moreover, at the time of an airflow rate switch controlling operation, the summing portion 207 sums the control output value for the supply air, outputted from the airflow rate changing portion 206, and the correction control output value, outputted from the correction output calculating portion 206, and sends the result to the supply air valve MAV.

Each individual controller 105, 106, and 107 explained in the present example can be embodied through a computer that is provided with a CPU, a memory device, and an interface, and a program for controlling these hardware resources. The CPU of each of these controllers 105, 106, and 107 executes the processes explained the present example through a program that is stored in the memory device.

Note that while in the present example a fume hood was used as one local exhaust device, the present invention can be applied also to devices that achieve the same role as a fume hood, such as a safety cabinet, and the like.

The present invention can be applied to room pressure controlling systems.

The invention claimed is:

1. A room pressure controlling system comprising:

a supply air valve regulating an airflow rate for supply air that is blown into an applicable room;

a common exhaust air valve regulating an airflow rate of exhaust air that is drawn from the applicable room;

an airflow rate controller outputting a control output value for the supply air valve and a control output value for the common exhaust air valve, so as to cause the difference between the supply airflow rate that is regulated by the supply air valve and the exhaust airflow rate that is regulated by the common exhaust valve to match a specific setting value, the airflow rate controller measuring a frequency of actuation of each of the supply air valve and the common exhaust air valve;

a differential pressure measuring device measuring a room pressure that is a pressure difference between an applicable room and a specific reference room;

a correction output calculator calculating a correction control output value for a valve that is operated as a room pressure controlling valve, which is either the supply air valve or the common exhaust air valve, based on a deviation between a room pressure measured by the differential pressure measuring device and a specific setting value;

a summing device summing the control output value corresponding to the valve that is used as the room pressure controlling valve and the correction control output value, and outputting the result to the room pressure controlling valve;

an airflow rate stability evaluating device evaluating whether or not at least one of the supply airflow rate and the exhaust airflow rate is changing; and a room pressure stability evaluating device evaluating whether or not the room pressure measured by the differential pressure measuring device is stable, wherein when it has been evaluated by the airflow rate stability evaluating device that at least one of the supply airflow rate and the exhaust airflow rate is changing, the correction output calculator performs a control calculation increasing rapid responsiveness of room pressure control more greatly than reducing the frequency of actuation of the room pressure controlling valve, and when the evaluation is that both of the supply airflow rate and the exhaust airflow rate are stable, the correction output calculator performs a control calculation reducing the frequency of actuation of the room pressure controlling valve more greatly than increasing the rapid responsiveness of the room pressure control, and when it has been evaluated by the airflow rate stability evaluating device that both of the supply airflow rate and the exhaust airflow rate are stable and it has been evaluated by the room pressure stability evaluating device that the room pressure is stable, the correction output calculator continues to output the correction control output value that was outputted in the immediately previous calculating period until a time of outputting a correction control output value in a calculating period that is after the current calculating period.

2. The room pressure controlling system as set forth in claim 1, further comprising:

a control parameter storage storing a plurality of control parameters for use in calculation processes by the correction output calculator, wherein:

when it has been evaluated by the airflow rate stability evaluating device that the airflow rate is changing, the correction output calculator reads out and uses, from the control parameter storage, a control parameter that increases the rapid responsiveness of the room pressure control more greatly than reducing the frequency of actuation of the room pressure controlling valve, and when it has been evaluated that the airflow rate is stable, then the correction output calculator reads out and uses, from the control parameter storage, a control parameter that reduces the frequency of actuation of the room pressure controlling valve more greatly than increasing the rapid responsiveness of the room pressure control.

3. The room pressure controlling system as set forth in claim 1, further comprising:

a calculating period storage storing a plurality of calculating periods used in the calculating processes of the correction output calculator, wherein:

when it has been evaluated by the airflow rate stability evaluating device that the airflow rate is changing, the correction output calculator reads out and uses, from the calculating period storage, a value for the calculating period that increases the rapid responsiveness of the room pressure control more greatly than reducing the frequency of actuation of the room pressure controlling valve, and when it has been evaluated that the airflow rate is stable, then the correction output calculator reads out and uses, from the calculating period storage, a value for the calculating period that reduces the frequency of actuation of the room pressure controlling valve more greatly than increasing the rapid responsiveness of the room pressure control.

4. The room pressure controlling system as set forth in claim 1, further comprising:

a fume hood equipped within the applicable room; and a local exhaust valve regulating the exhaust airflow rate of the fume hood; and a local exhaust airflow rate regulator controlling the local exhaust air valve so that the planar air speed of a sash plane of the fume hood is a specified value; wherein:

the airflow rate controller outputs a control output value for the supply air valve and a control output value for the common exhaust air valve so that the difference between the supply airflow rate that is regulated by the supply air valve and the exhaust airflow rate that is regulated by the local exhaust air valve and the common exhaust air valve matches a specific setting value.

* * * * *